United States Patent
Li et al.

(10) Patent No.: US 10,744,728 B2
(45) Date of Patent: Aug. 18, 2020

(54) APPLICATION OF SELF-HEALING MATERIAL IN 3D PRINTING

(71) Applicant: NANJING UNIVERSITY, Nanjing, Jiangsu (CN)

(72) Inventors: Chenghui Li, Jiangsu (CN); Jiancheng Lai, Jiangsu (CN); Xiaozeng You, Jiangsu (CN)

(73) Assignee: NANJING UNIVERSITY, Nanjing, Jiangsu (CN)

( * ) Notice: Subject to any disclaimer, the term of this patent is extended or adjusted under 35 U.S.C. 154(b) by 61 days.

(21) Appl. No.: 16/084,619

(22) PCT Filed: Jun. 29, 2016

(86) PCT No.: PCT/CN2016/087670
§ 371 (c)(1),
(2) Date: Sep. 13, 2018

(87) PCT Pub. No.: WO2018/000242
PCT Pub. Date: Jan. 4, 2018

(65) Prior Publication Data
US 2019/0077100 A1    Mar. 14, 2019

(51) Int. Cl.
| | | |
|---|---|---|
| *B29C 73/18* | (2006.01) | |
| *C08L 83/06* | (2006.01) | |
| *B29C 64/00* | (2017.01) | |
| *C08L 83/04* | (2006.01) | |
| *C08L 83/08* | (2006.01) | |
| *B29C 73/16* | (2006.01) | |
| *C08G 77/26* | (2006.01) | |
| *B33Y 70/00* | (2020.01) | |
| *B29K 83/00* | (2006.01) | |

(52) U.S. Cl.
CPC .............. *B29C 73/18* (2013.01); *B29C 64/00* (2017.08); *B29C 73/16* (2013.01); *C08G 77/26* (2013.01); *C08L 83/04* (2013.01); *C08L 83/06* (2013.01); *C08L 83/08* (2013.01); *B29K 2083/00* (2013.01); *B29K 2995/0037* (2013.01); *B33Y 70/00* (2014.12)

(58) Field of Classification Search
None
See application file for complete search history.

(56) References Cited

FOREIGN PATENT DOCUMENTS

| | | | |
|---|---|---|---|
| CN | 104961881 A | 10/2015 | |
| CN | 105088043 A | 11/2015 | |
| CN | 105111470 A | 12/2015 | |
| JP | 2007186684 A | * 7/2007 | ............. C08G 85/00 |

OTHER PUBLICATIONS

Liu et al. "Self-healing polymers based on thermally reversable Diels-Alder chemistry" Polym. Chem. 2013, 4, 2194. (Year: 2013).*
Machine translation of JP-2007186684, translation generated Mar. 2020, 33 pages. (Year: 2020).*

* cited by examiner

*Primary Examiner* — Robert S Loewe
(74) *Attorney, Agent, or Firm* — Novick, Kim & Lee, PLLC; Allen Xue

(57) ABSTRACT

The present invention provides application of a self-healing material in 3D printing. In the present invention, a self-healing material is taken as a 3D printing material, and the material is intelligently detected and spontaneously healed by utilizing a self-healing function of the self-healing material, so that a potential damage to the self-healing material caused by generated micro-cracks can be prevented. Compared with molding conditions of a product, gentle and mild conditions are required for self-healing, and the overall performance of the product cannot be affected from beginning to end of a self-healing process, thereby reducing the maintenance cost of the product, prolonging the service life of the product, and increasing the utilization rate of resources.

5 Claims, No Drawings

APPLICATION OF SELF-HEALING MATERIAL IN 3D PRINTING

BACKGROUND

Technical Field

The present invention relates to the technical field of 3D printing, and more particularly relates to application of a self-healing material in 3D printing.

Related Art 3D printing is an emerging technology developing rapidly in the field of manufacturing industry in the present century, referred to as a "manufacturing technology having industrial revolution significance". This technology is one of rapid prototyping technologies, also referred to as additive manufacturing. The fundamental principle of the 3D printing technology is similar to that of an ink-jet printing technology or a laser printing technology. On the basis of a digital model file, a 3D model made in a manner such as designing or scanning is cut into an infinite number of sections in accordance with a certain coordinate axis, corresponding materials are printed layer by layer from a printer nozzle, subjected to molding by temperature drop or photo-curing, or subjected to laser sintering or melting selectively, and are stacked together in accordance with an original position to form a three-dimensional entity. The 3D printing technology simplifies a manufacturing procedure of a product, shortens the lead time of the product, increases the efficiency, reduces the cost, and has been widely applied to the fields of product prototype, model manufacturing, art making, jewelry making, bioengineering and medicine, building, garment and the like.

The 3D printing technology has achieved a remarkable development, but still faces some challenges. Under normal circumstances, a product obtained by 3D printing is an assembly of many parts in ordinary machinery manufacturing. It is advantageous in that the overall performance of the product can be increased, resource and energy consumptions generated in a part assembly process are reduced, and meanwhile, a product which cannot be implemented by an existing process or technology can be prepared, thereby increasing the flexibility of production. Whilst the advantages are presented, the disadvantages are very obvious. Due to once integral molding, after a product prepared from a 3D printing material has micro-cracks or is damaged by the outside, the functionality of the entire product will be affected, and the whole product must be replaced, thereby increasing the maintenance cost of the product, and causing a great waste. After an entity or member printed by utilizing an existing 3D printing material has micro-cracks or is damaged by the outside, the entity or member cannot be restored to a normal state, thereby directly affecting the service life of the product and causing the problem of a potential safety hazard.

SUMMARY

The present invention is directed to application of a self-healing material in 3D printing, and aims to provide a 3D printing material capable of detecting own micro-cracks and spontaneously heal a local or overall damage.

The present invention provides application of a self-healing material in 3D printing, a self-healing material being taken as a 3D printing material.

Preferably, the self-healing material is one of the following materials: a self-healing material achieving a self-healing function by utilizing a reversible covalent bond, a self-healing material achieving a self-healing function by utilizing a non-covalent interaction, and a self-healing material achieving a self-healing function by utilizing a coordinate bond.

Preferably, the covalent bond in the self-healing material achieving a self-healing function by utilizing a reversible covalent bond is a disulfide bond, an imine bond, or a carbon-carbon covalent bond generated by a diene addition reaction.

Preferably, the non-covalent interaction in the self-healing material achieving a self-healing function by utilizing a non-covalent interaction is a hydrogen bond, a halogen bond, an electrostatic interaction, a hydrophobic interaction, or a n-n stacking or crystallization interaction. Preferably, the coordinate bond in the self-healing material achieving a self-healing function by utilizing a coordinate bond is a coordinate bond formed by nitrogen, oxygen, carbon, boron, sulfur or phosphorus with metal.

Preferably, a self-healing mode of the self-healing material is one or more of thermal healing, photo-healing, additive-assisted healing and non-irritant automatic healing.

Preferably, the self-healing material is prepared from a raw material including polysiloxane having a structure as shown in Formula 1:

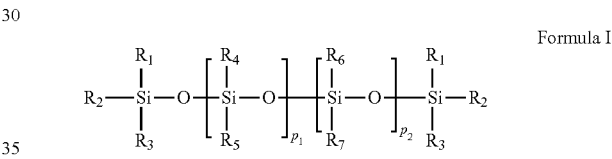

Formula I where $p_1$ is in a range of 1 to 1000, and $p_2$ is in a range of 1 to 1000;

$R_1$ to $R_7$ are independently selected from a group consisting of C1-C8 alkyl, phenyl and one of Formula II to Formula X:

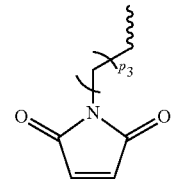

Formula II

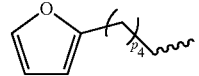

Formula III

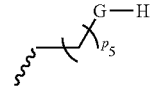

Formula IV

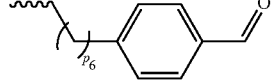

Formula V

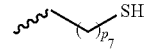

Formula VI

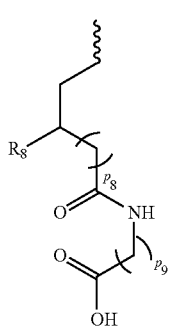

Formula VII

Formula VIII

Formula IX

Formula X in Formula II to Formula X, $p_3$ to $p_{11}$ are independently selected from a group consisting of 0 to 50;

G is —NH—, —O—, —S— or —CH(O)CH—;

$R_8$ to $R_9$ are independently selected from a group consisting of a hydrogen atom or alkyl having 1 to 30 carbon atoms; and X is a halogen atom.

Preferably, a ratio of $p_1$ to $p_2$ is in a range of 1/3 to 100.

Preferably, $p_1$ is in a range of 10 to 800, and $p_2$ is in a range of 10 to 800.

Preferably, $R_1$ to $R_7$ are independently selected from a group consisting of methyl, phenyl and one of Formula II to Formula X.

According to application of a self-healing material in 3D printing, provided by the present invention, a self-healing material is taken as a 3D printing material, and a crack in the material can be intelligently detected and spontaneously healed, so that a potential damage to the self-healing material caused by generated micro-cracks can be prevented. Compared with molding conditions of a product, gentle and mild conditions are required for self-healing, and the overall performance of the product cannot be affected from beginning to end of a self-healing process, thereby reducing the maintenance cost of the product, prolonging the service life of the product, and increasing the utilization rate of resources. A test result shows that the healing rate of a product, printed by taking a self-healing material as a 3D printing material in the present invention and healed for 6 h, can reach 98%.

DETAILED DESCRIPTION

The present invention provides application of a self-healing material in 3D printing, a self-healing material being taken as a 3D printing material. In the present invention, the self-healing material is preferably one of the following materials: a self-healing material achieving a self-healing function by utilizing a reversible covalent bond, a self-healing material achieving a self-healing function by utilizing a non-covalent interaction, and a self-healing material achieving a self-healing function by utilizing a coordinate bond.

In the present invention, the covalent bond in the self-healing material achieving a self-healing function by utilizing a reversible covalent bond is preferably a disulfide bond, an imine bond, or a carbon-carbon covalent bond generated by a diene addition reaction. In the present invention, the non-covalent interaction in the self-healing material achieving a self-healing function by utilizing a non-covalent interaction is preferably a hydrogen bond, a halogen bond, an electrostatic interaction, a hydrophobic interaction, or a π-π stacking or crystallization interaction, more preferably a hydrogen bond or an electrostatic interaction. In the present invention, the coordinate bond in the self-healing material achieving a self-healing function by utilizing a coordinate bond is a coordinate bond formed by nitrogen, oxygen, carbon, boron, sulfur or phosphorus with metal. In the present invention, a self-healing mode of the self-healing material is preferably one or more of thermal healing, photo-healing, additive-assisted healing and non-irritant automatic healing, more preferably thermal healing or photo-healing.

In the present invention, the self-healing material is preferably prepared from a raw material including polysiloxane having a structure as shown in Formula 1:

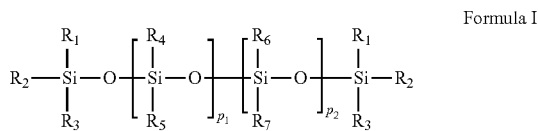

Formula I where $p_1$ is preferably in a range of 0 to 1000, more preferably in a range of 10 to 800, most preferably in a range of 100 to 200;

$p_2$ is preferably in a range of 1 to 1000, more preferably in a range of 10 to 800, most preferably in a range of 100 to 200;

A ratio of $p_1$ to $p_2$ is preferably in a range of 1/3 to 100, more preferably in a range of 1 to 50, most preferably in a range of 5 to 15;

$R_1$ to $R_7$ are, preferably, independently selected from a group consisting of C1-C8 alkyl, phenyl and one of Formula II to Formula X, more preferably, independently selected from a group consisting of methyl, phenyl and one of Formula II to Formula X:

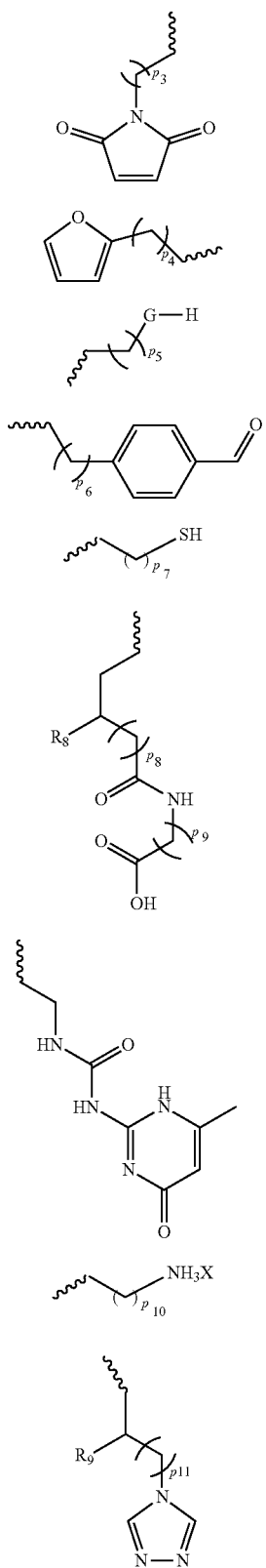

Formula II
Formula III
Formula IV
Formula V
Formula VI
Formula VII
Formula VIII
Formula IX
Formula X in Formula II to Formula X, $p_3$ to $p_{11}$ are, preferably, independently selected from a group consisting of 0 to 50, more preferably, independently selected from a group consisting of 3 to 20, most preferably, independently selected from a group consisting of 5 to 10;

G is preferably —NH—, —O—, —S— or —CH(O)CH—;

$R_8$ to $R_9$ are independently selected from a group consisting of a hydrogen atom or alkyl having 1 to 30 carbon atoms; and X is a halogen atom.

In the present invention, the self-healing material is preferably a self-healing material achieving a self-healing function by utilizing a carbon-carbon covalent bond generated by a diene addition reaction, namely a self-healing material based on a D-A reaction. In the present invention, raw materials of the self-healing material based on a D-A reaction preferably include polysiloxane A and polysiloxane B having different structures.

In the present invention, the polysiloxane A is preferably polysiloxane having a structure as shown in Formula I, at least one of $R_1$ to $R_7$ in Formula I is preferably Formula II, and $p_3$ in Formula II is preferably in a range of 0 to 10, more preferably in a range of 1 to 3.

In the present invention, the polysiloxane B is preferably polysiloxane having a structure as shown in Formula I, at least one of $R_1$ to $R_7$ in Formula I is preferably Formula III, and $p_3$ in Formula II is preferably in a range of 0 to 10, more preferably in a range of 1 to 3.

In the present invention, application of the self-healing material based on a D-A reaction in 3D printing preferably includes the following steps:

(1) mixing polysiloxane A and polysiloxane B with a solvent, so as to obtain a pre-printing material;

(2) heating the pre-printing material obtained in step (1), and performing a cross-linking reaction to obtain a 3D printing material; and (3) printing the 3D printing material obtained in step (2), so as to obtain a product.

The present invention preferably mixes polysiloxane A and polysiloxane B with a solvent, so as to obtain a pre-printing material. The present invention does not make a special limitation to the solvent, and may adopt an organic solvent well known to those skilled in the art. In the present invention, the solvent is preferably one or more of an aromatic hydrocarbon solvent, an aliphatic hydrocarbon solvent, an alicyclic hydrocarbon solvent, a halogenated hydrocarbon solvent, an alcohols solvent, an ethers solvent, an esters solvent, a ketones solvent, a diol derivative and a nitrogenous solvent, more preferably one or more of benzene, methylbenzene, xylene, styrene, pentane, hexane, octane, cyclohexane, cyclohexanone, methylbenzene cyclohexanone, chlorobenzene, dichlorobenzene, dichloromethane, chloroform, perchloroethylene, trichloroethylene, methyl alcohol, ethyl alcohol, isopropyl alcohol, diethyl ether, epoxypropane, ethylene glycol ether, methyl acetate, ethyl acetate, propyl acetate, ethylene glycol monomethyl ether, ethylene glycol monoethyl ether, ethylene glycol monobutyl ether, acetonitrile, pyridine, phenol, diethanol amine, tetrahydrofuran and acetonitrile, most preferably methyl alcohol, dichloromethane or tetrahydrofuran.

The present invention does not make a special limitation to the operation of mixing, and may adopt a technical solution of mixing well known to those skilled in the art. The present invention preferably mixes a polysiloxane A solution and a polysiloxane B solution, so as to obtain a pre-printing material. In the present invention, the mass concentration of polysiloxane A in the polysiloxane A solution is preferably in a range of 40 to 60%, more preferably in a range of 45 to 55%, most preferably in a range of 48 to 52%. In the present invention, the mass concentration of polysiloxane B in the polysiloxane B solution is preferably in a range of 40 to 60%, more preferably in a range of 45 to 55%, most preferably in a range of 48 to 52%. In the present invention, a mass ratio of the polysiloxane A to the polysiloxane B is preferably in a range of 1:0.8 to 1.2, more preferably in a range of 1:0.9 to 1.1.

In the present invention, the temperature of mixing is preferably in a range of 20 to 30° C., more preferably in a range of 23 to 26° C. In the present invention, the mixing is preferably performed under a stirring condition. In the present invention, the stirring is preferably mechanical stirring; the rate of stirring is preferably in a range of 800 to 1200 rmp/min, more preferably in a range of 900 to 1100 rmp/min, most preferably in a range of 950 to 1050 rmp/min; and the time of stirring is preferably in a range of 1.5 to 2.5 h, more preferably in a range of 1.8 to 2.2 h.

After a pre-printing material is obtained, the present invention preferably heats the pre-printing material, and performs a cross-linking reaction to obtain a 3D printing material. The present invention does not make a special limitation to the mode of heating, and adopts a technical solution of heating well known to those skilled in the art. In the present invention, the heating is preferably oil bath heating; and the rate of heating is preferably in a range of 8 to 12° C./min, more preferably in a range of 9 to 11° C./min In the present invention, the temperature of the cross-linking reaction is preferably in a range of 70 to 80° C., more preferably in a range of 74 to 76° C.; and the preservation time of the temperature of the cross-linking reaction is preferably in a range of 10 to 14 h, more preferably in a range of 11 to 13 h, most preferably in a range of 11.5 to 12.5 h. In the present invention, the cross-linking reaction is preferably performed under a stirring condition; and the rate of stirring is preferably in a range of 800 to 1200 rmp/min, more preferably in a range of 900 to 1100 rmp/min, most preferably in a range of 950 to 1050 rmp/min.

In order to increase the plasticity of a polymer, the present invention preferably mixes the pre-printing material with a plasticizer before heating. In the present invention, the mass of the plasticizer is preferably 1 to 10% of the total mass of polysiloxane, more preferably 3 to 6%. The present invention does not make a special limitation to the type of the plasticizer, and may adopt a plasticizer well known to those skilled in the art. In the present invention, the plasticizer is preferably Phthalate Esters (PAEs), more preferably one or more of Di-N-Octyl Phthalate (DNOP or DnOP), Butyl Benzyl Phthalate (BBP), Dicapryl Phthalate (DCP), Dicyclohexyl Phthalate (DCHP), Dibutyl Phthalate (DBP), Diisobutyl Phthalate (DIBP), Dimethyl Phthalate (DMP), Diethyl Phthalate (DEP), Diisononyl Phthalate (DINP) and Di-Iso-Decyl Phthalate (DIDP).

In order to increase the color of a product, the present invention preferably mixes the pre-printing material with a color additive before heating. In the present invention, the mass of the color additive is preferably 1 to 5% of the total mass of polysiloxane, more preferably 2 to 3%. The present invention does not make a special limitation to the type of the color additive, and may adopt a color additive well known to those skilled in the art. In the present invention, the color additive is preferably one or more of a natural inorganic color additive, an artificial inorganic color additive, a natural organic color additive and an artificial organic color additive. In the present invention, the natural inorganic color additive is one or more of smoke black, chalk, cinnabar, red clay, realgar, natural iron oxide, wollastonite, barite powder, talcum powder, mica powder and kaolin; the artificial inorganic color additive is one or more of titanium white, lithopone, lead chromate yellow and iron blue; the natural organic color additive is one or more of rattan yellow, alizarin red and indigo blue; and the artificial organic color additive is one or more of pigment scarlet, azo yellow, phthalocyanine blue and quinacridone.

After the cross-linking reaction is completed, the present invention preferably removes excessive solvents in a reaction product, so as to obtain a 3D printing material. The present invention does not make a special limitation to the operation of solvent removal, and may adopt an operation of solvent removal well known to those skilled in the art. The present invention preferably distills a product obtained in the cross-linking reaction under reduced pressure, so as to obtain a 3D printing material. In the present invention, the temperature of reduced pressure distillation is preferably in a range of 45 to 55° C., more preferably in a range of 48 to 52° C.; the pressure of reduced pressure distillation is preferably in a range of 0.009 to 0.011 kPa; and the time of reduced pressure distillation is preferably in a range of 1.5 to 2.5 h, more preferably in a range of 1.8 to 2.2 h.

After a 3D printing material is obtained, the present invention preferably prints the 3D printing material, so as to obtain a product. In the present invention, the temperature of printing is preferably in a range of 140 to 160° C., more preferably in a range of 145 to 155° C.

In the present invention, a self-healing mechanism of a 3D printing product made of the self-healing material based on a D-A reaction is preferably as shown in a reaction formula (1):

Reaction formula (1)

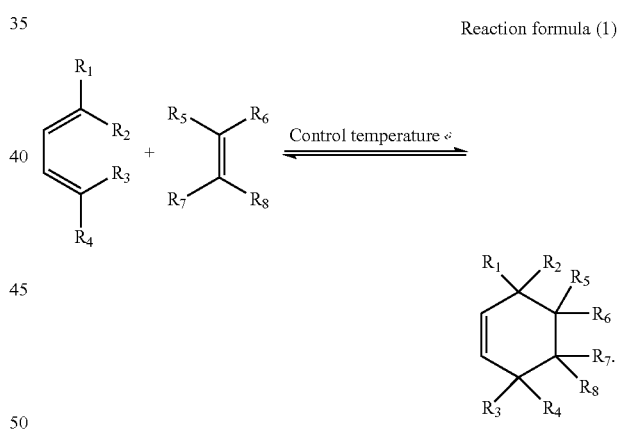

where $R_1$ to $R_8$ are substituent groups on a double bond.

Under a normal state, in the 3D printing product made of the self-healing material based on a D-A reaction, dienes are connected with each other in a covalent bond manner. After a material has micro-cracks or is damaged by the outside, the covalent bond between the dienes is damaged, and the dienes are present in a form of 1,3-butadiene with substituent groups and ethylene with substituent groups respectively. By thermally treating an area which has micro-cracks or is damaged by the outside, the D-A reaction may be re-performed toward cyclization, thereby healing the material.

The self-healing material is preferably a self-healing material achieving a self-healing function by utilizing an imine bond, namely a self-healing material based on an imine bond. In the present invention, raw materials of the self-healing material based on an imine bond preferably include polysiloxane C and polysiloxane D having different structures.

In the present invention, the polysiloxane C is preferably polysiloxane having a structure as shown in Formula I, at least one of $R_1$ to $R_7$ in Formula I is preferably Formula IV, $p_5$ in Formula IV is preferably in a range of 0 to 10, more preferably in a range of 1 to 3, and G in Formula IV is preferably —NH—.

In the present invention, the polysiloxane D is preferably polysiloxane having a structure as shown in Formula I, at least one of $R_1$ to $R_7$ in Formula I is preferably Formula V, and $p_6$ in Formula V is preferably in a range of 0 to 10, more preferably in a range of 1 to 3.

In the present invention, application of the self-healing material based on an imine bond in 3D printing preferably includes the following steps:

(1) mixing polysiloxane C and polysiloxane D with a solvent, so as to obtain a pre-printing material;

(2) heating the pre-printing material obtained in step (1), and performing a cross-linking reaction to obtain a 3D printing material; and (3) printing the 3D printing material obtained in step (2), so as to obtain a product.

The present invention preferably mixes polysiloxane C and polysiloxane D with a solvent, so as to obtain a pre-printing material. In the present invention, a mass ratio of the polysiloxane C to the polysiloxane D is preferably in a range of 1:0.8 to 1.2, more preferably in a range of 1:0.9 to 1.1. In the present invention, the operation of preparing a pre-printing material is preferably the same as the foregoing technical solution, and will not be elaborated herein.

After a pre-printing material is obtained, the present invention preferably heats the pre-printing material, and performs a cross-linking reaction to obtain a 3D printing material. In the present invention, the operation of heating is preferably the same as the foregoing technical solution, and will not be elaborated herein. In the present invention, the temperature of the cross-linking reaction is preferably in a range of 90 to 110° C., more preferably in a range of 95 to 115° C.; and the preservation time of the temperature of the cross-linking reaction is preferably in a range of 5 to 7 h, more preferably in a range of 5.5 to 6.5 h. In the present invention, the cross-linking reaction is preferably performed under a stirring condition; and the rate of stirring is preferably in a range of 800 to 1200 rmp/min, more preferably in a range of 900 to 1100 rmp/min, most preferably in a range of 950 to 1050 rmp/min.

In order to increase the plasticity of a polymer, the present invention preferably mixes the pre-printing material with a plasticizer before heating. In order to increase the color of a product, the present invention preferably mixes the pre-printing material with a color additive before heating. In the present invention, the type and dosage of the plasticizer and the color additive are preferably the same as those of the plasticizer and the color additive in the foregoing technical solution, and will not be elaborated herein.

After the cross-linking reaction is completed, the present invention preferably removes excessive solvents in a reaction product, so as to obtain a 3D printing material. The present invention preferably adopts the method in the foregoing technical solution to remove the excessive solvents in the reaction product.

After a 3D printing material is obtained, the present invention preferably prints the 3D printing material, so as to obtain a product. In the present invention, the temperature of printing is preferably in a range of 120 to 140° C., more preferably in a range of 125 to 135° C.

In the present invention, a self-healing mechanism of a 3D printing product made of the self-healing material based on an imine bond is preferably as shown in a reaction formula (2):

Reaction formula (2)

where R is a substituent group on an N atom, and R' is a substituent group on a double bond C.

Under a normal state, in the 3D printing product made of the self-healing material based on an imine bond, an aldehyde group and an amino group are condensed to form an imine bond. After a material has micro-cracks or is damaged by the outside, the imine bond at an interface is in a dynamic balance. After an area which has micro-cracks or is damaged by the outside is thermally treated, the imine bond may be dynamically exchanged with the adjacent amino group or aldehyde group, so as to form a new imine bond and a new amino group and aldehyde group, thereby healing the material.

The self-healing material is preferably a self-healing material achieving a self-healing function by utilizing a disulfide bond, namely a self-healing material based on a disulfide bond. In the present invention, raw materials of the self-healing material based on a disulfide bond preferably include polysiloxane E.

In the present invention, the polysiloxane E is preferably polysiloxane having a structure as shown in Formula I, at least one of $R_1$ to $R_7$ in Formula I is preferably Formula VI, and $p_7$ in the formula is preferably in a range of 0 to 10, more preferably in a range of 1 to 3.

In the present invention, application of the self-healing material based on a disulfide bond in 3D printing preferably includes the following steps:

(1) mixing polysiloxane E with a solvent, so as to obtain a pre-printing material;

(2) performing mixing heating on the pre-printing material obtained in step (1) and $H_2O_2$, and performing a cross-linking reaction to obtain a 3D printing material; and (3) printing the 3D printing material obtained in step (2), so as to obtain a product.

The present invention preferably mixes polysiloxane E with a solvent, so as to obtain a pre-printing material. In the present invention, the operation of preparing a pre-printing material is preferably the same as the foregoing technical solution, and will not be elaborated herein.

After a pre-printing material is obtained, the present invention preferably performs mixing heating on the pre-printing material and $H_2O_2$, and performs a cross-linking reaction to obtain a 3D printing material. In the present invention, the mass is preferably 0.8 to 1.2 times that of polysiloxane, more preferably 0.9 to 1.1 times, most preferably 0.95 to 1.05 times. In the present invention, the operation of heating is preferably the same as the foregoing technical solution, and will not be elaborated herein. In the present invention, the temperature of the cross-linking reaction is preferably in a range of 40 to 60° C., more preferably in a range of 45 to 55° C.; and the preservation time of the temperature of the cross-linking reaction is preferably in a range of 5 to 7 h, more preferably in a range of 5.5 to 6.5 h.

In the present invention, the cross-linking reaction is preferably performed under a stirring condition; and the rate of stirring is preferably in a range of 800 to 1200 rmp/min, more preferably in a range of 900 to 1100 rmp/min, most preferably in a range of 950 to 1050 rmp/min In order to increase the plasticity of a polymer, the present invention preferably mixes the pre-printing material with a plasticizer before heating. In order to increase the color of a product, the present invention preferably mixes the pre-printing material with a color additive before heating. In the present invention, the type and dosage of the plasticizer and the color additive are preferably the same as those of the plasticizer and the color additive in the foregoing technical solution, and will not be elaborated herein.

After the cross-linking reaction is completed, the present invention preferably removes excessive solvents in a reaction product, so as to obtain a 3D printing material. The present invention preferably adopts the method in the foregoing technical solution to remove the excessive solvents in the reaction product.

After a 3D printing material is obtained, the present invention preferably prints the 3D printing material, so as to obtain a product. In the present invention, the temperature of printing is preferably in a range of 90 to 110° C., more preferably in a range of 95 to 105° C.

In the present invention, a self-healing mechanism of a 3D printing product made of the self-healing material based on a disulfide bond is preferably as shown in a reaction formula (3):

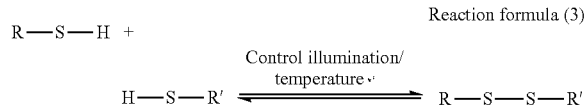

where R and R' are substituent groups on an S atom.

Under a normal state, in the 3D printing product made of the self-healing material based on a disulfide bond, two sulfur atoms are connected with each other in a covalent bond manner so as to form a disulfide bond. After a material has micro-cracks or is damaged by the outside, the disulfide bond is damaged to form a reduced —S—H bond. By means of controlling illumination or temperature, the reaction may be performed toward generation of the disulfide bond, thereby healing the material.

The self-healing material is preferably a self-healing material achieving a self-healing function by utilizing a hydrogen bond, namely a self-healing material based on a hydrogen bond. In the present invention, raw materials of the self-healing material based on a hydrogen bond preferably include polysiloxane F.

In the present invention, the polysiloxane F is preferably polysiloxane having a structure as shown in Formula I, at least one of $R_1$ to $R_7$ in Formula I is preferably one or two of Formula VII and Formula VIII, and $p_8$ and $p_9$ in Formula VII are, preferably, independently selected from a group consisting of 0 to 10, more preferably a group consisting of 1 to 5.

In the present invention, application of the self-healing material based on a hydrogen bond in 3D printing preferably includes the following steps:

(1) mixing polysiloxane F with a solvent, so as to obtain a pre-printing material;

(2) heating the pre-printing material obtained in step (1), and performing a cross-linking reaction to obtain a 3D printing material; and (3) printing the 3D printing material obtained in step (2), so as to obtain a product.

The present invention preferably mixes polysiloxane F with a solvent, so as to obtain a pre-printing material. In the present invention, the operation of preparing a pre-printing material is preferably the same as the foregoing technical solution, and will not be elaborated herein.

After a pre-printing material is obtained, the present invention preferably heats the pre-printing material, and performs a cross-linking reaction to obtain a 3D printing material. In the present invention, the operation of heating is preferably the same as the foregoing technical solution, and will not be elaborated herein. In the present invention, the temperature of the cross-linking reaction is preferably in a range of 40 to 60° C., more preferably in a range of 45 to 55° C.; and the preservation time of the temperature of the cross-linking reaction is preferably in a range of 5 to 7 h, more preferably in a range of 5.5 to 6.5 h. In the present invention, the cross-linking reaction is preferably performed under a stirring condition; and the rate of stirring is preferably in a range of 800 to 1200 rmp/min, more preferably in a range of 900 to 1100 rmp/min, most preferably in a range of 950 to 1050 rmp/min.

In order to increase the plasticity of a polymer, the present invention preferably mixes the pre-printing material with a plasticizer before heating. In order to increase the color of a product, the present invention preferably mixes the pre-printing material with a color additive before heating. In the present invention, the type and dosage of the plasticizer and the color additive are preferably the same as those of the plasticizer and the color additive in the foregoing technical solution, and will not be elaborated herein.

In the present invention, a pH value of the cross-linking reaction is preferably in a range of 3 to 11, more preferably in a range of 5 to 9. In order to regulate the pH value, the present invention preferably mixes the pre-printing material with a pH regulator before heating. In the present invention, the dosage of the pH regulator is preferably 1 to 30% of the total mass of polysiloxane, more preferably 5 to 10%. The present invention does not make a special limitation to the type of the pH regulator, and may adopt a pH regulator well known to those skilled in the art. In the present invention, the pH regulator is one or more of organic acid, organic alkali, inorganic acid and inorganic alkali, wherein the organic acid is preferably organic acid including carboxyl (—COOH), sulfonic acid (—SO3H), sulfinic acid (RSOOH) and thionothiolic acid (RCOSH), more preferably para-toluenesulfonic acid and/or trifluoroacetic acid; the organic alkali is preferably organic alkali including amino group and/or amido, more preferably triethylamine and/or ethylenediamine; the inorganic acid is preferably one or more of hydrochloric acid, sulfuric acid, sulfinic acid, nitric acid, nitrous acid, phosphoric acid, phosphorous acid, hypophosphorous acid, perchloric acid, hypochlorous acid, permanganic acid and carbonic acid; and the inorganic alkali is preferably one or more of hydroxide of alkali metal, hydroxide of alkali-earth metal, weak-acid salt of alkali metal and weak-acid salt of alkali-earth metal, more preferably one or more of potassium bicarbonate, sodium bicarbonate, potassium carbonate, sodium carbonate, sodium hydroxide and potassium hydroxide.

After the cross-linking reaction is completed, the present invention preferably removes excessive solvents in a reaction product, so as to obtain a 3D printing material. The present invention preferably adopts the method in the foregoing technical solution to remove the excessive solvents in the reaction product.

After a 3D printing material is obtained, the present invention preferably prints the 3D printing material, so as to obtain a product. In the present invention, the temperature of printing is preferably in a range of 50 to 70° C., more preferably in a range of 55 to 65° C.

In the present invention, a self-healing mechanism of a 3D printing product made of the self-healing material based on a hydrogen bond interaction is preferably as shown in a reaction formula (4):

Reaction formula (4)

where X is an electron donor in a hydrogen bond, R is a substituent group connected to the electron donor in the hydrogen bond, H is a hydrogen atom, R' is a substituent group connected to the hydrogen atom, solid lines are covalent bonds, and a dotted line is the hydrogen bond.

Under a normal state, in the 3D printing product made of the self-healing material based on a hydrogen bond interaction, a hydrogen bond interaction is present between a hydrogen atom and an electron donor. After a material has micro-cracks or is damaged by the outside, the hydrogen bond interaction disappears, and both the hydrogen atom and the electron donor are in a free state. By thermally treating an area which has micro-cracks or is damaged by the outside, the hydrogen bond interaction may be reformed, thereby healing the material.

The self-healing material is preferably a self-healing material achieving a self-healing function by utilizing an electrostatic interaction, namely a self-healing material based on an electrostatic interaction. In the present invention, raw materials of the self-healing material based on an electrostatic interaction preferably include polysiloxane G and polysiloxane H having different structures.

In the present invention, the polysiloxane G is preferably polysiloxane having a structure as shown in Formula I, at least one of $R_1$ to $R_7$ in Formula I is preferably Formula IX, and $p_m$ in Formula IX is preferably in a range of 0 to 10, more preferably in a range of 1 to 3.

In the present invention, the polysiloxane H is preferably polysiloxane having a structure as shown in Formula I, at least one of $R_1$ to $R_7$ in Formula I is preferably Formula VII, and $p_8$ and $p_9$ in Formula VII are, preferably, independently selected from a group consisting of 0 to 10, more preferably a group consisting of 1 to 5.

In the present invention, application of the self-healing material based on an electrostatic interaction in 3D printing preferably includes the following steps:

(1) mixing polysiloxane G and polysiloxane H with a solvent, so as to obtain a pre-printing material;

(2) heating the pre-printing material obtained in step (1), and performing a cross-linking reaction to obtain a 3D printing material; and (3) printing the 3D printing material obtained in step (2), so as to obtain a product.

The present invention preferably mixes polysiloxane H and polysiloxane G with a solvent, so as to obtain a pre-printing material. In the present invention, the operation of preparing a pre-printing material is preferably the same as the foregoing technical solution, and will not be elaborated herein. In the present invention, a mass ratio of the polysiloxane H to the polysiloxane G is preferably in a range of 1:0.8 to 1.2, more preferably in a range of 1:0.9 to 1.1.

After a pre-printing material is obtained, the present invention preferably heats the pre-printing material, and performs a cross-linking reaction to obtain a 3D printing material. In the present invention, the operation of heating is preferably the same as the foregoing technical solution, and will not be elaborated herein. In the present invention, the temperature of the cross-linking reaction is preferably in a range of 40 to 60° C., more preferably in a range of 45 to 55° C.; and the preservation time of the temperature of the cross-linking reaction is preferably in a range of 5 to 7 h, more preferably in a range of 5.5 to 6.5 h. In the present invention, the cross-linking reaction is preferably performed under a stirring condition; and the rate of stirring is preferably in a range of 800 to 1200 rmp/min, more preferably in a range of 900 to 1100 rmp/min, most preferably in a range of 950 to 1050 rmp/min.

In order to increase the plasticity of a polymer, the present invention preferably mixes the pre-printing material with a plasticizer before heating. In order to increase the color of a product, the present invention preferably mixes the pre-printing material with a color additive before heating. In the present invention, a pH value of the cross-linking reaction is preferably in a range of 3 to 11, more preferably in a range of 5 to 9. In order to regulate the pH value, the present invention preferably mixes the pre-printing material with a pH regulator before heating. In the present invention, the type and dosage of the plasticizer, the color additive and the pH regulator are preferably the same as those of the plasticizer, the color additive and the pH regulator in the foregoing technical solution, and will not be elaborated herein.

After the cross-linking reaction is completed, the present invention preferably removes excessive solvents in a reaction product, so as to obtain a 3D printing material. The present invention preferably adopts the method in the foregoing technical solution to remove the excessive solvents in the reaction product.

After a 3D printing material is obtained, the present invention preferably prints the 3D printing material, so as to obtain a product. In the present invention, the temperature of printing is preferably in a range of 50 to 70° C., more preferably in a range of 55 to 65° C.

In the present invention, a self-healing mechanism of a 3D printing product made of the self-healing material based on an electrostatic interaction is preferably as shown in a reaction formula (5):

Reaction formula (5)

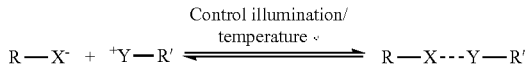

where $X^-$ is an anion, $Y^+$ is a cation, R is a substituent group on the anion, R' is a substituent group on the cation, solid lines are covalent bonds, and a dotted line is an ionic bond.

Under a normal state, in the self-healing 3D printing material based on an ionic bond, an anion and a cation are connected with each other in an ionic bond manner. After a material has micro-cracks or is damaged by the outside, the ionic bond will be damaged to form a corresponding anion and cation. By means of controlling illumination or temperature, the anion and the cation may be re-bonded to form a corresponding ionic bond, thereby healing the material.

The self-healing material is preferably a self-healing material achieving a self-healing function by utilizing a metal coordination interaction, namely a self-healing material based on a metal coordination interaction. In the present invention, raw materials of the self-healing material based on a disulfide bond preferably include polysiloxane J.

In the present invention, the polysiloxane J is preferably polysiloxane having a structure as shown in Formula I, at least one of $R_1$ to $R_7$ in Formula I is preferably Formula X, and $p_{11}$ in Formula X is preferably in a range of 0 to 10, more preferably in a range of 1 to 3.

In the present invention, application of the self-healing material based on a metal coordination interaction in 3D printing preferably includes the following steps:

(1) mixing polysiloxane J and metal salt with a solvent, so as to obtain a pre-printing material;

(2) heating the pre-printing material obtained in step (1), and performing a cross-linking reaction to obtain a 3D printing material; and (3) printing the 3D printing material obtained in step (2), so as to obtain a product.

The present invention preferably mixes polysiloxane J and metal salt with a solvent, so as to obtain a pre-printing material. In the present invention, the mass of the metal salt is preferably 2 to 50% of that of polysiloxane, more preferably 5 to 30%, most preferably 10 to 20%. In the present invention, the metal salt is preferably one or more of chlorate, nitrate, sulfate, acetate, phosphate, perchlorate and permanganate of alkali metal, alkali-earth metal, transition metal and rare-earth metal, more preferably one or more of chlorate, nitrate, sulfate, acetate, phosphate, perchlorate and permanganate of transition metal, most preferably one or more of ferric chloride, zinc chloride, cobalt chloride, nickel chloride, europium chloride, ferric nitrate, cobalt nitrate, nickel nitrate, zinc nitrate and europium nitrate. In the present invention, the operation of preparing a pre-printing material is preferably the same as the foregoing technical solution, and will not be elaborated herein.

After a pre-printing material is obtained, the present invention preferably heats the pre-printing material, and performs a cross-linking reaction to obtain a 3D printing material. In the present invention, the operation of heating is preferably the same as the foregoing technical solution, and will not be elaborated herein. In the present invention, the temperature of the cross-linking reaction is preferably in a range of 40 to 60° C., more preferably in a range of 45 to 55° C.; and the preservation time of the temperature of the cross-linking reaction is preferably in a range of 5 to 7 h, more preferably in a range of 5.5 to 6.5 h. In the present invention, the cross-linking reaction is preferably performed under a stirring condition; and the rate of stirring is preferably in a range of 800 to 1200 rmp/min, more preferably in a range of 900 to 1100 rmp/min, most preferably in a range of 950 to 1050 rmp/min.

In order to increase the plasticity of a polymer, the present invention preferably mixes the pre-printing material with a plasticizer before heating. In order to increase the color of a product, the present invention preferably mixes the pre-printing material with a color additive before heating. In the present invention, the type and dosage of the plasticizer and the color additive are preferably the same as those of the plasticizer and the color additive in the foregoing technical solution, and will not be elaborated herein.

After the cross-linking reaction is completed, the present invention preferably removes excessive solvents in a reaction product, so as to obtain a 3D printing material. The present invention preferably adopts the method in the foregoing technical solution to remove the excessive solvents in the reaction product.

After a 3D printing material is obtained, the present invention preferably prints the 3D printing material, so as to obtain a product. In the present invention, the temperature of printing is preferably in a range of 110 to 130° C., more preferably in a range of 115 to 125° C.

In the present invention, a self-healing mechanism of a 3D printing product made of the self-healing material based on a metal coordination interaction is preferably as shown in a reaction formula (6):

Reaction formula (6)

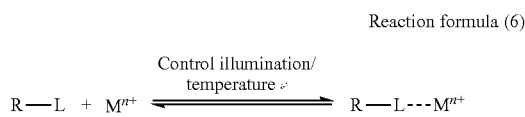

where L is a coordination group having a coordination point, R is a substituent group connected to the coordination group, $M^{n+}$ is a metal ion, $n^+$ is a positive valence state presented by a metal atom, solid lines are covalent bonds, and a dotted line is a coordination bond.

Under a normal state, in the 3D printing product made of the self-healing material based on a metal coordination interaction, a coordination bond is formed between a coordination group and a metal ion, and is in a coordination state. After a material has micro-cracks or is damaged by the outside, the coordination bond is broken, and the coordination group and the metal ion are in a free state. By thermally treating an area which has micro-cracks or is damaged by the outside, the coordination bond may be reformed, thereby healing the material.

In order to further illustrate the present invention, application of a self-healing material in 3D printing provided in the present invention will be described below in conjunction with the embodiments in detail. However, they cannot be understood as limitations to the scope of protection of the present invention.

Embodiment 1

(1) Calculate in accordance with a mass fraction, dissolve 50 parts of polysiloxane A into 50 parts of dichloromethane, dissolve 50 parts of polysiloxane B into 50 parts of dichloromethane, mix solutions of the polysiloxane A and the polysiloxane B at 25° C., and stir for 2 h under the mechanical stirring of 1000 rmp/min at 25° C., so as to obtain a pre-printing material.

A structure formula of polysiloxane is as shown in Formula I:

where $R_1$ to $R_6$ are methyl;

for polysiloxane A, $R_7$ is Formula II, where $p_1$ is equal to $p_2$, having a value in a range of 80 to 100, and the value of $p_3$ is 1; and for polysiloxane B, $R_7$ is Formula III, where $p_1$ is equal to $p_2$, having a value in a range of 80 to 100, and the value of $p_4$ is 1.

(2) Heat the pre-printing material obtained in (1) at a rate of 10° C./min under an oil bath, raise the temperature to 75° C., react for 12 h under the mechanical stirring of 1000 rmp/min, distill at 50° C. for 2 h under reduced pressure after the reaction is finished, so as to obtain a D-A reaction cross-linked polysiloxane material, wherein the pressure value is 0.01kPa, the yield is 98.5%, the purity is 97%, and the material is a self-healing 3D printing material based on a D-A reaction.

(3) Print at 140° C., so as to obtain a product.

The product printed from the printing material may be self-healing by heating at 80° C., the healing efficiency of healing for 6 h reaching 98%.

Embodiment 2

(1) Calculate in accordance with a mass fraction, dissolve 50 parts of polysiloxane A into 50 parts of dichloromethane, dissolve 50 parts of polysiloxane B into 50 parts of dichloromethane, mix solutions of the polysiloxane A and the polysiloxane B at 25° C., and stir for 2 h under the mechanical stirring of 1000 rmp/min at 25° C., so as to obtain a pre-printing material.

A structure formula of polysiloxane is as shown in Formula I:

where $R_2$ to $R_7$ are methyl;

for polysiloxane A, $R_1$ is Formula IV, where $p_1$ is equal to $p_2$, having a value in a range of 80 to 100, the value of $p_5$ is 3, and G is —NH—; and for polysiloxane B, $R_1$ is Formula V, where $p_1$ is equal to $p_2$, having a value in a range of 80 to 100, and the value of $p_6$ is 1.

(2) Heat the pre-printing material obtained in (1) at a rate of 10° C./min under an oil bath, raise the temperature to 75° C., and react for 6 h under the mechanical stirring of 1000 rmp/min; heat at a rate of 10° C./min, raise the temperature to 100° C., and react for 6 h under the mechanical stirring of 1000 rmp/min; and distill at 50° C. for 2 h under reduced pressure after the reaction is finished, so as to obtain a polysiloxane material based on an imine bond, wherein the pressure value is 0.01 kPa, the yield is 98.5%, the purity is 97%, and the material is a self-healing 3D printing material based on an imine bond.

(3) Print at 120° C., so as to obtain a product.

The product printed from the printing material may be self-healing by heating at 70° C., the healing efficiency of healing for 6 h reaching 98%.

Embodiment 3

(1) Calculate in accordance with a mass fraction, dissolve 50 parts of polysiloxane A into 50 parts of tetrahydrofuran, dissolve 50 parts of polysiloxane B into 50 parts of tetrahydrofuran, mix solutions of the polysiloxane A and the polysiloxane B at 25° C., and stir for 2h under the mechanical stirring of 1000 rmp/min at 25° C., so as to obtain a pre-printing material.

A structure formula of polysiloxane is as shown in Formula I:

for polysiloxane A, $R_2$ to $R_7$ are methyl, $R_1$ is Formula VI, $p_7$ is 3, and $p_1$ is equal to $p_2$, having a value in a range of 80 to 100; and for polysiloxane B, $R_1$ to $R_6$ are methyl, $R_7$ is Formula VI, $p_7$ is 3, and $p_1$ is equal to $p_2$, having a value in a range of 80 to 100.

(2) Add 100 parts of $H_2O_2$ into the pre-printing material obtained in (1), and react for 6 h under the mechanical stirring of 1000 rmp/min at 25° C.; heat at a rate of 10° C./min, raise the temperature to 50° C., and react for 6 h under the mechanical stirring of 1000 rmp/min; and distill at 50° C. for 2 h under reduced pressure after the reaction is finished, so as to obtain a polysiloxane material based on a disulfide bond, wherein the pressure value is 0.01 kPa, the yield is 98.5%, the purity is 97%, and the material is a self-healing 3D printing material based on a disulfide bond.

(3) Print at 100° C., so as to obtain a product.

The product printed from the printing material may be self-healing by heating at 50° C., the healing efficiency of healing for 6h reaching 98%.

The product printed from the printing material may be self-healing by illumination via a 10 W fluorescent lamp at a distance of 20 cm at 25° C., the healing efficiency of healing for 6 h reaching 98%.

Embodiment 4

(1) Calculate in accordance with a mass fraction, dissolve 50 parts of polysiloxane A into 50 parts of tetrahydrofuran, dissolve 50 parts of polysiloxane B into 50 parts of tetrahydrofuran, mix solutions of the polysiloxane A and the polysiloxane B at 25° C., and stir for 2 h under the mechanical stirring of 1000 rmp/min at 25° C., so as to obtain a pre-printing material.

A structure formula of polysiloxane is as shown in Formula I:

for polysiloxane A, when $R_1$ to $R_6$ are methyl, $R_7$ is Formula VII, $R_8$ is methyl, $p_8$ is 1, and $p_9$ is 5, $p_1$ is equal to $p_2$, having a value in a range of 80 to 100; and for polysiloxane B, when $R_1$ to $R_6$ are methyl, and $R_7$ is Formula VIII, $p_1$ is equal to $p_2$, having a value in a range of 80 to 100.

(2) Heat the pre-printing material obtained in (1) at a rate of 10° C./min, raise the temperature to 50° C., and react for 6 h under the mechanical stirring of 1000 rmp/min; and distill at 50° C. for 2 h under reduced pressure after the reaction is finished, so as to obtain a polysiloxane material based on a hydrogen bond, wherein the pressure value is 0.01kPa, the yield is 98.5%, the purity is 97%, and the material is a self-healing 3D printing material based on a hydrogen bond.

(3) Print at 60° C., so as to obtain a product.

The product printed from the printing material may be self-healing by heating at 50° C., the healing efficiency of healing for 6 h reaching 98%.

Embodiment 5

(1) Calculate in accordance with a mass fraction, dissolve 50 parts of polysiloxane A into 50 parts of methyl alcohol, dissolve 50 parts of polysiloxane B into 50 parts of methyl alcohol, mix solutions of the polysiloxane A and the polysiloxane B at 25° C., and stir for 2 h under the mechanical stirring of 1000 rmp/min at 25° C., so as to obtain a pre-printing material.

A structure formula of polysiloxane is as shown in Formula I:

for polysiloxane A, when $R_2$ to $R_7$ are methyl, $R_7$ is Formula IX, $p_{10}$ is 3, and X is Cl, $p_1$ is equal to $p_2$, having a value in a range of 80 to 100; and for polysiloxane B, when $R_1$ to $R_6$ are methyl, $R_7$ is Formula VII, $R_8$ is methyl, $p_8$ is 1, and $p_9$ is 5, $p_1$ is equal to $p_2$, having a value in a range of 80 to 100.

(2) Heat the pre-printing material obtained in (1) at a rate of 10° C./min, raise the temperature to 50° C., and react for 6 h under the mechanical stirring of 1000 rmp/min; and distill at 50° C. for 2 h under reduced pressure after the reaction is finished, so as to obtain a polysiloxane material based on an electrostatic interaction, wherein the pressure value is 0.01 kPa, the yield is 98.5%, the purity is 97%, and the material is a self-healing 3D printing material based on an electrostatic interaction.

(3) Print at 60° C., so as to obtain a product.

The product printed from the printing material may be self-healing by heating at 25° C., the healing efficiency of healing for 6 h reaching 98%.

Embodiment 6

(1) Calculate in accordance with a mass fraction, dissolve 90 parts of polysiloxane A into 100 parts of methyl alcohol, dissolve 10 parts of $FeCl_3$ into 20 parts of methyl alcohol, mix solutions of the polysiloxane A and the $FeCl_3$ at 25° C., and stir for 2 h under the mechanical stirring of 1000 rmp/min at 25° C., so as to obtain a pre-printing material.

A structure formula of polysiloxane is as shown in Formula I:

for polysiloxane A, when $R_1$ to $R_6$ are methyl, $R_7$ is Formula X, $R_9$ is methyl, and $p_{11}$ is 1, $p_1$ is equal to $p_2$, having a value in a range of 80 to 100.

(2) Heat the pre-printing material obtained in (1) at a rate of 10° C./min, raise the temperature to 50° C., and react for 6 h under the mechanical stirring of 1000 rmp/min; and distill at 50° C. for 2 h under reduced pressure after the reaction is finished, so as to obtain a polysiloxane material based on a coordination bond, wherein the pressure value is 0.01kPa, the yield is 98.5%, the purity is 97%, and the material is a self-healing 3D printing material based on a coordination bond.

(3) Print at 120° C., so as to obtain a product.

The product printed from the printing material may be self-healing by heating at 75° C., the healing efficiency of healing for 6 h reaching 98%.

From the above embodiments, it can be seen that a self-healing material 3D printing product provided in the present invention has a good self-healing performance, the healing efficiency of healing for 6 h reaching 98%.

The descriptions in the above embodiments are merely used to auxiliarily understand the method of the present invention and the core idea thereof. It should be pointed out that those of ordinary skill in the art may also make several improvements and modifications on the present invention without departing from the principle of the present invention, these improvements and modifications also falling within the scope of protection claimed by the present invention. Many modifications for these embodiments are obvious to those skilled in the art, and an ordinary principle defined herein may be implemented in other embodiments without departing from the spirit or scope of the present invention. Therefore, the present invention will not be limited to these embodiments herein, and should meet the broadest scope consistent with the principle and novel characteristics disclosed herein.

What is claimed is:

1. A self-healing material prepared from a raw material comprising polysiloxane having a structure as shown in Formula 1:

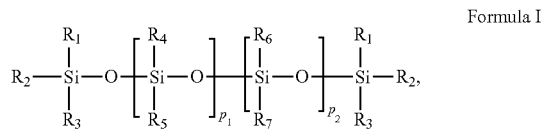

Formula I where $p_1$ is in a range of 1 to 1000, and $p_2$ is in a range of 1 to 1000;

$R_1$ to $R_7$ are independently selected from the group consisting of C1-C8 alkyl, phenyl, and functional group of Formula VII

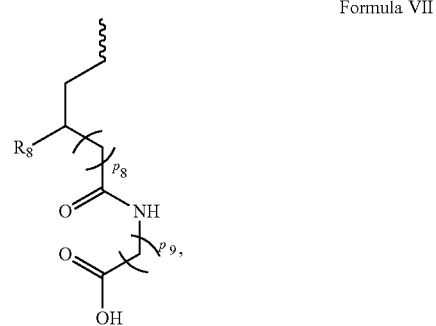

Formula VII wherein $p_8$ and $p_9$ are independently a number from 0 to 50; and $R_8$ is selected from the group consisting of a hydrogen atom and alkyls having 1 to 30 carbon atoms.

2. The self-healing material according to claim 1, wherein a ratio of $p_1$ to $p_2$ is in a range of ⅓ to 100.

3. The self-healing material according to claim 1, wherein $p_1$ is in a range of 10 to 800, and $p_2$ is in a range of 10 to 800.

4. The self-healing material according to claim 1, wherein $R_1$ to $R_7$ are independently selected from a group consisting of methyl, phenyl, and the functional group of Formula VII.

5. A 3D printing material, comprising a self-healing material of claim 1.

* * * * *